Oct. 18, 1938.  J. A. PEREYRA  2,133,755
VOTE REGISTERING APPARATUS
Filed April 3, 1933  7 Sheets-Sheet 1
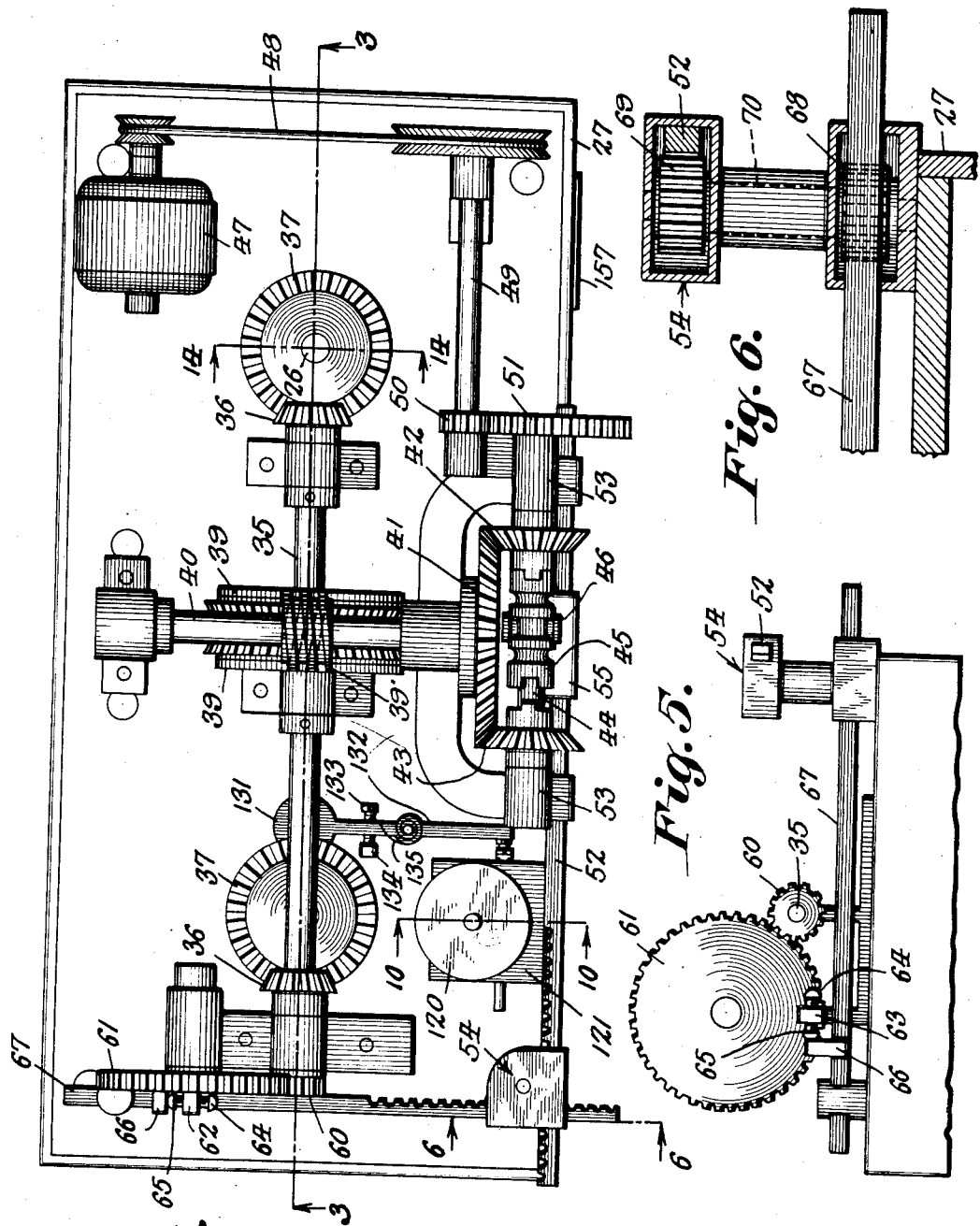
J. A. Pereyra, INVENTOR
BY Victor J. Evans & Co.
ATTORNEY

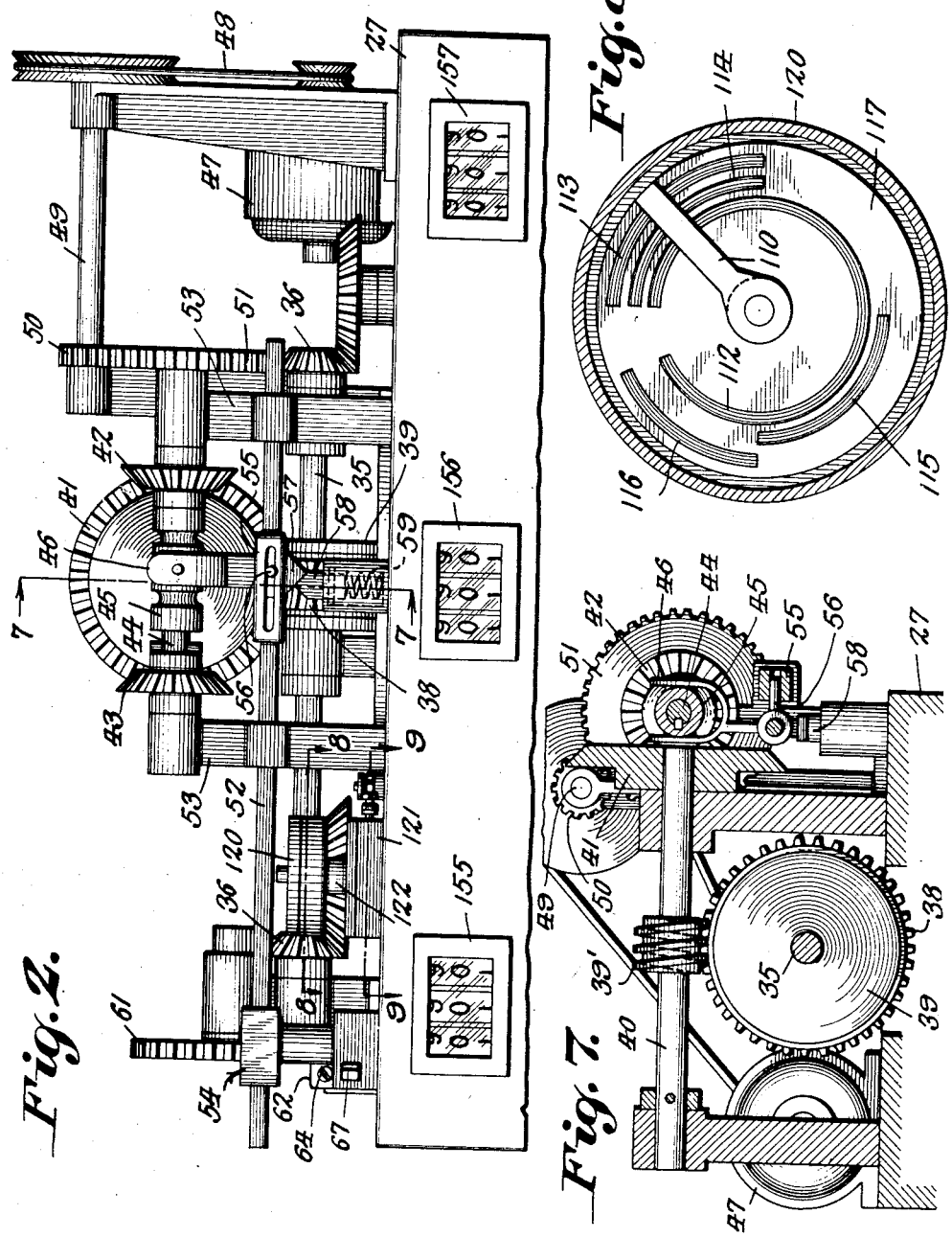

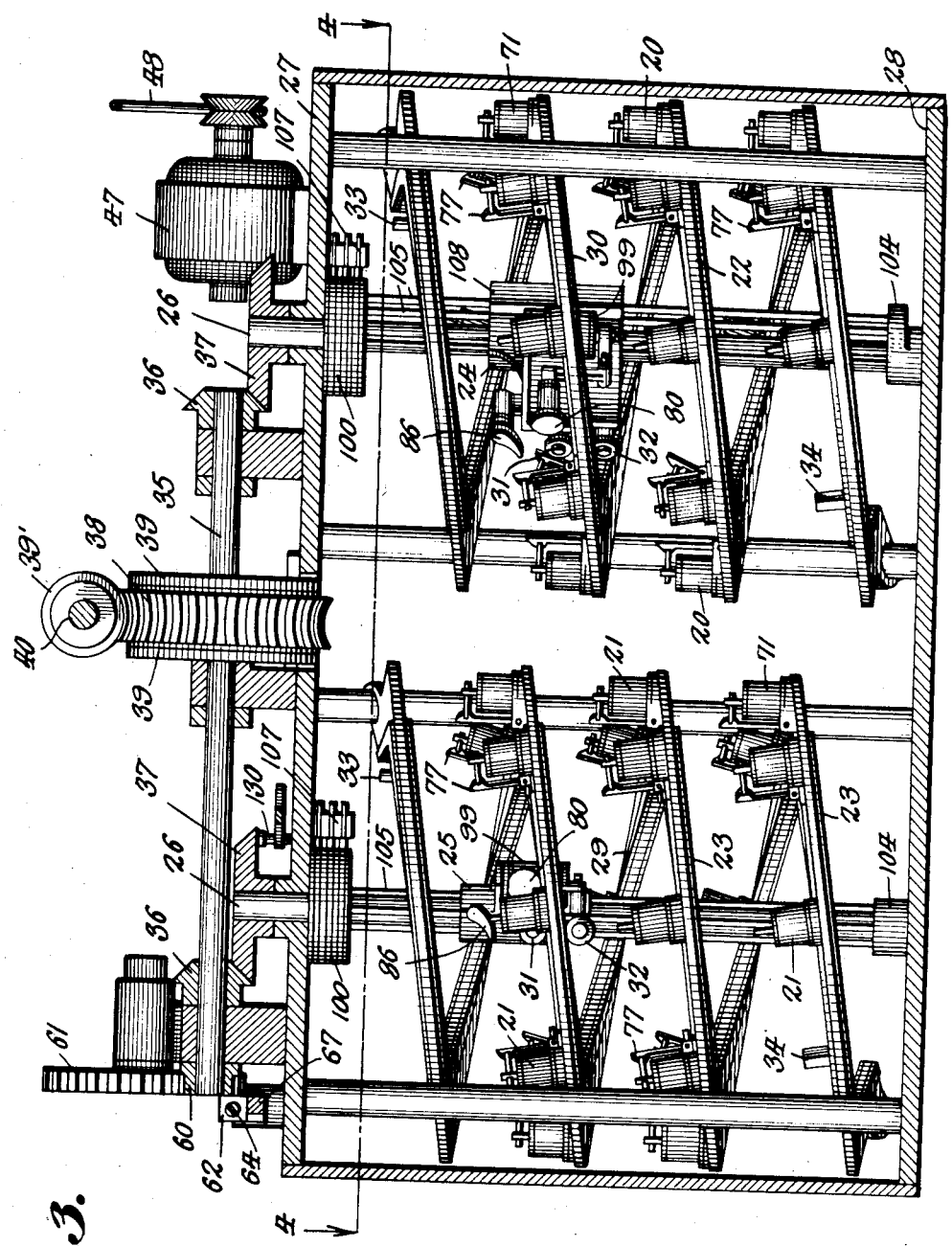

Oct. 18, 1938.    J. A. PEREYRA    2,133,755
VOTE REGISTERING APPARATUS
Filed April 3, 1933    7 Sheets-Sheet 4
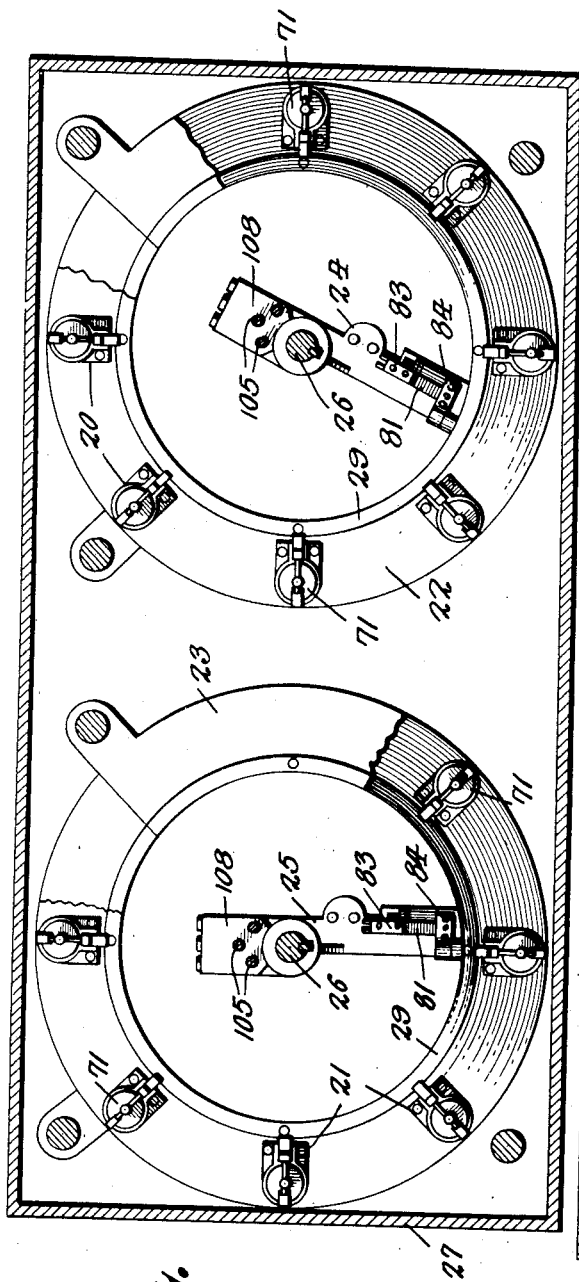
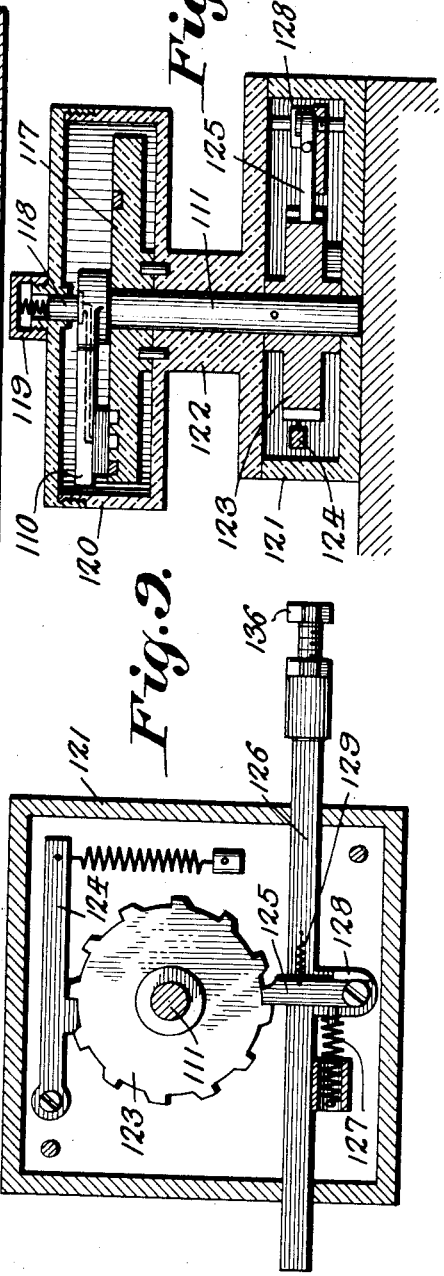
J. A. Pereyra, INVENTOR
BY Victor J. Evans & Co.
ATTORNEY Oct. 18, 1938.  J. A. PEREYRA  2,133,755
VOTE REGISTERING APPARATUS
Filed April 3, 1933  7 Sheets-Sheet 5
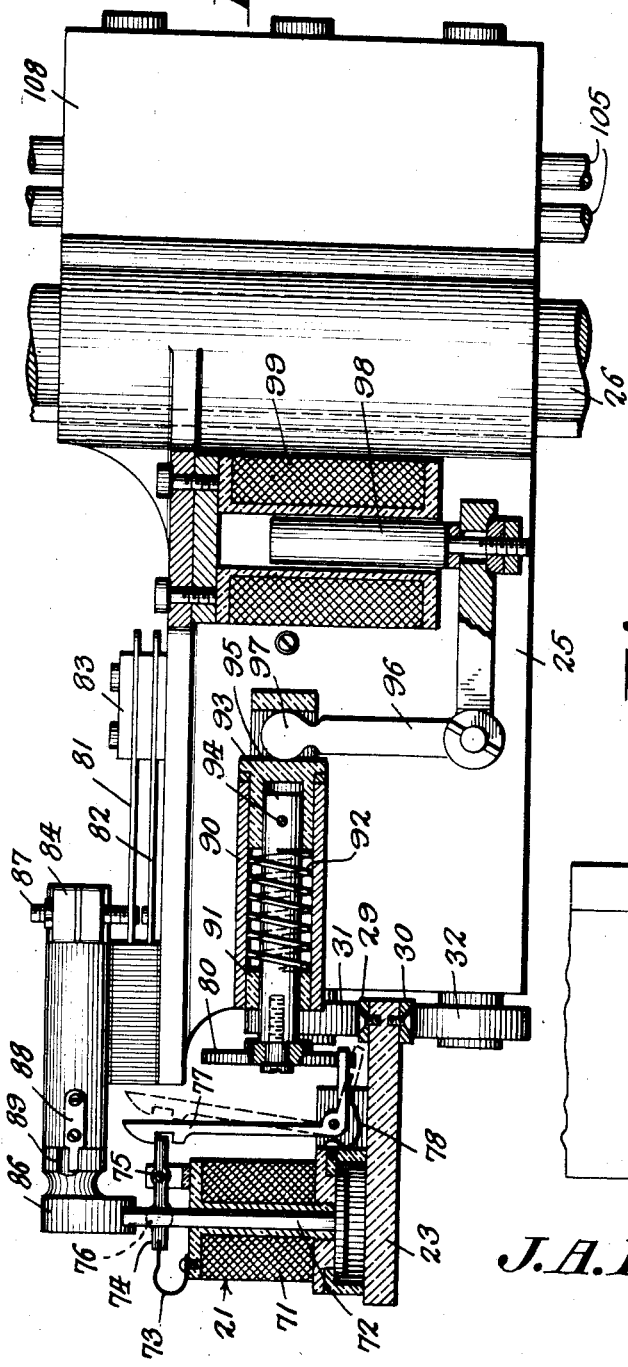
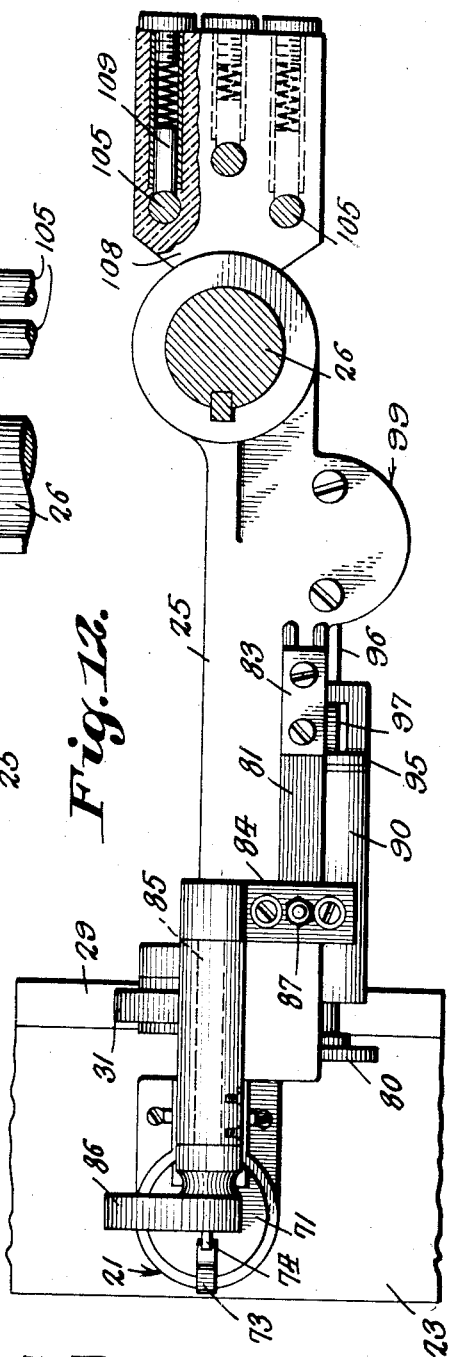
J. A. Pereyra, INVENTOR
BY Victor J. Evans & Co.
ATTORNEY Oct. 18, 1938.  J. A. PEREYRA  2,133,755
VOTE REGISTERING APPARATUS
Filed April 3, 1933   7 Sheets-Sheet 6
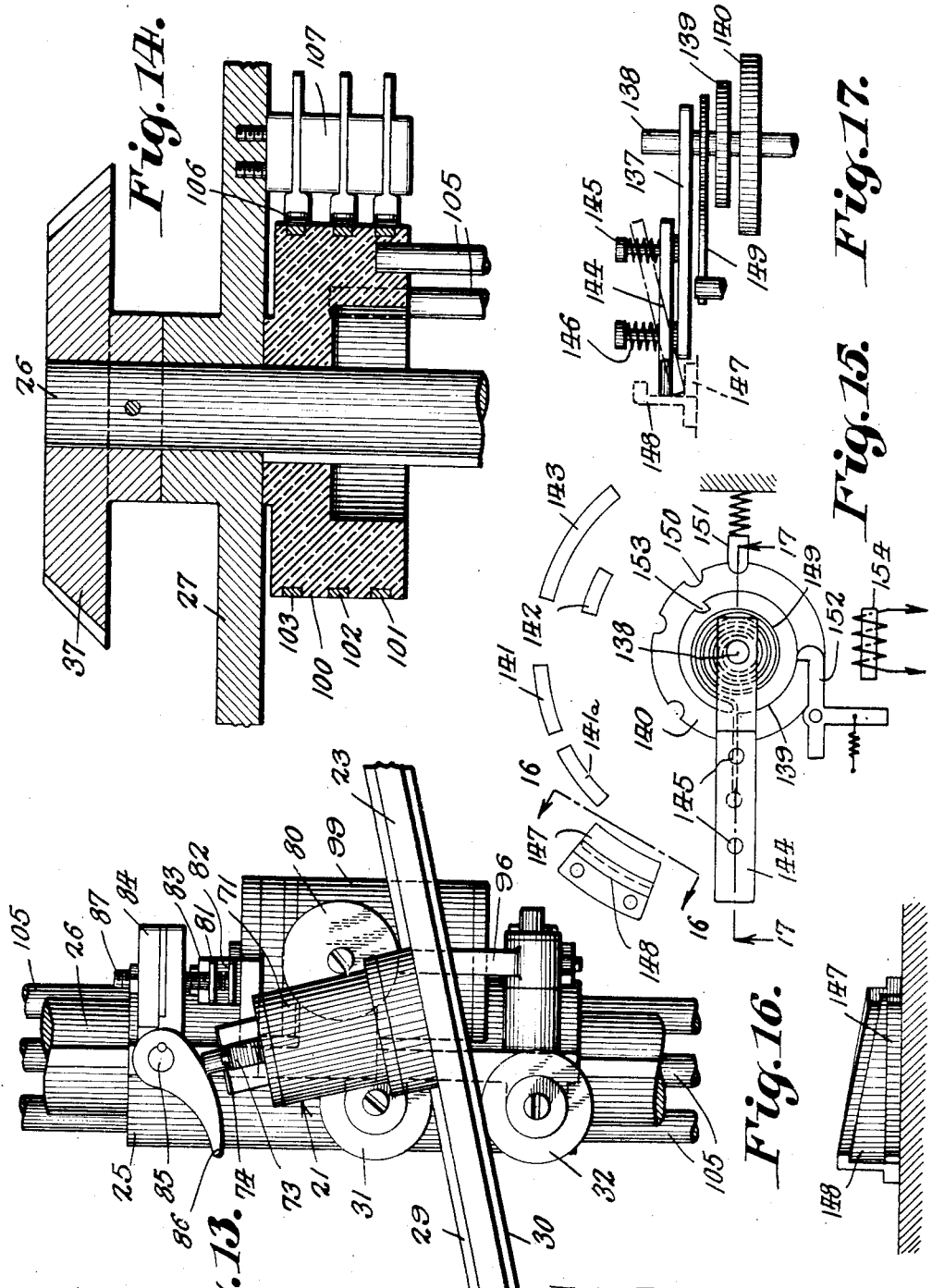
J. A. Pereyra, INVENTOR
BY Victor J. Evans & Co.
ATTORNEY Patented Oct. 18, 1938

2,133,755

UNITED STATES PATENT OFFICE 2,133,755

VOTE REGISTERING APPARATUS

José A. Pereyra, Lima, Peru

Application April 3, 1933, Serial No. 664,250

10 Claims. (Cl. 235—52)

The object of the invention is to provide a vote registering apparatus adapted for registering the "ayes" and "noes" on such questions as may be put before a convention or legislative body by the mere action of the voting member or delegate in pressing a button or circuit closer identified as affirmative or negative on the question put; to provide an apparatus of the kind indicated which incorporates a totalling register, so that the sum of the "ayes" and "nays" may be checked against the total; to provide a voting apparatus which when started will initially set all of the registers to zero and then automatically and selectively actuate the individual registers and then the totalling register, or vice versa, and will then automatically come to rest after performing one series of operations; to provide a voting apparatus which makes it possible to keep a positive check on its operative condition, so that there may be no chance of false totals; and generally to provide apparatus of the kind indicated which, for the functions to be performed, is of comparatively simple form and susceptible of cheap manufacture.

With this object in view, the invention consists in a construction and combination of parts of which a preferred embodiment is illustrated in the accompanying drawings but to which embodiment the invention is not to be restricted. Continued use in practice may dictate certain changes or alterations and the right is claimed to make any which fall within the scope of the annexed claims.

In the drawings:

Figure 1 is a plan view of a voting apparatus constructed in accordance with the invention.

Figure 2 is a front elevational view of the top portion of the apparatus comprising the invention.

Figure 3 is a sectional view on the plane indicated by the line 3—3 of Figure 1.

Figure 4 is a sectional view on the plane indicated by the line 4—4 of Figure 3.

Figure 5 is an elevational view of the upper part of the apparatus looking at the end from the left hand side as viewed in Figure 1.

Figure 6 is a sectional view on the plane indicated by the line 6—6 of Figure 1.

Figure 18:
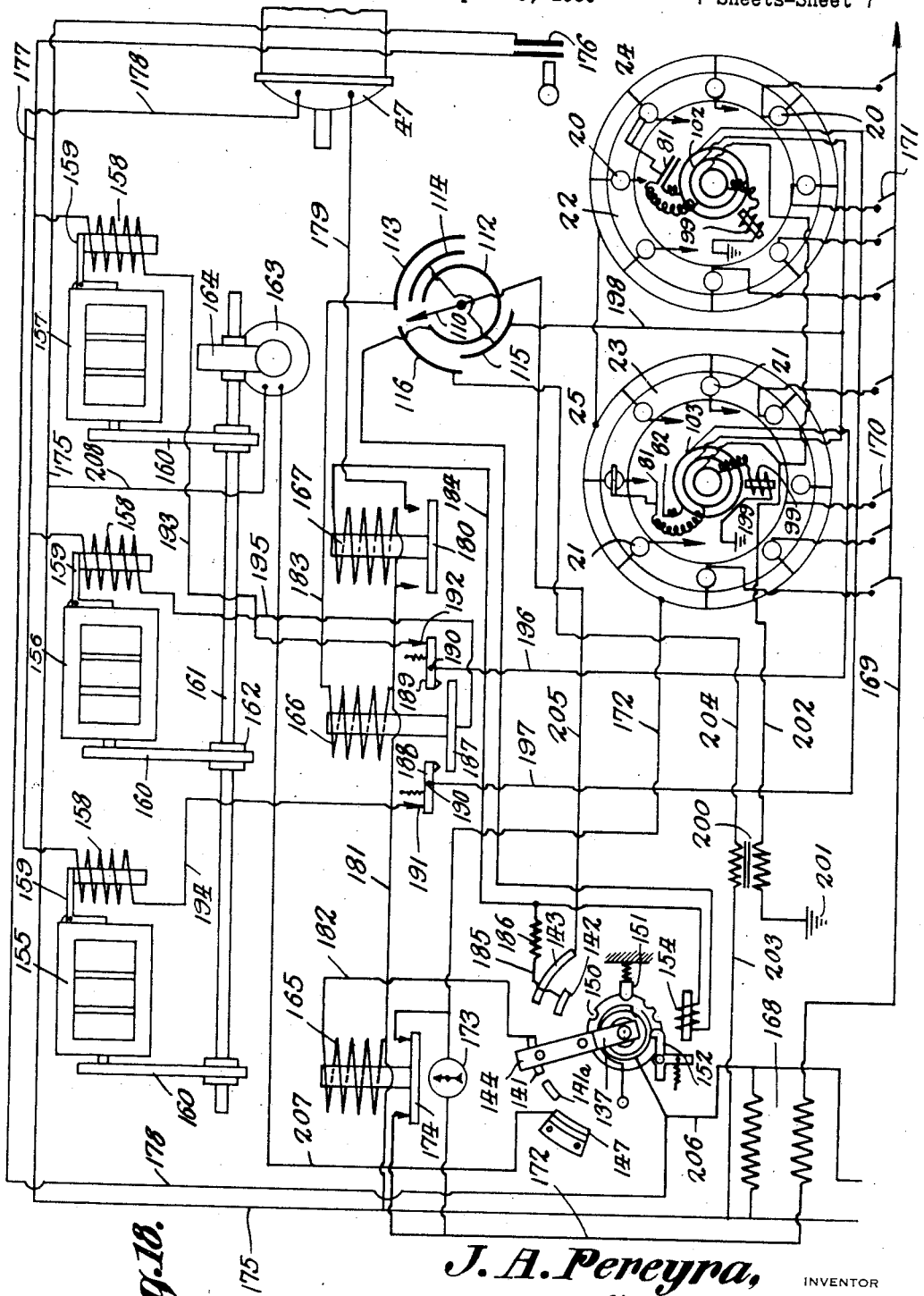

Figures 7, 8 and 9 are sectional views on the planes indicated by the lines 7—7, 8—8 and 9—9 respectively of Figure 2.

Figure 10 is a sectional view on the plane indicated by the line 10—10 of Figure 1.

Figure 11 is a side elevational view, partly in section, of the traveler.

Figure 12 is a top plan view, partly in section of the structure of Figure 11.

Figure 13 is an elevational view of one of the stations and the associated portion of the track as well as an end view of the traveler looking at the track engaging end.

Figure 14 is a sectional view on the plane indicated by the line 14—14 of Figure 1.

Figure 15 is a plan view of the manual control.

Figures 16 and 17 are sectional views on the planes indicated by the lines 16—16 and 17—17 respectively of Figure 15.

Figure 18 is a diagrammatic view of the apparatus.

The invention is carried into effect by the provision of a duality of groups of stations 20 and 21 arranged at uniform angular distances on spiral tracks 22 and 23, the stations in each group being identical with each other and with the stations in the other group. The stations are arranged for the actuation of a circuit closer carried on a traveler, the traveler 24 being associated with the stations 20 and the traveler 25 associated with the stations 21. Except when the stations are rendered operative, they have no effect on the passing traveler but if and when they are rendered operative, the circuit closer carried by the traveler is operated and each circuit closer is designed to control a register, so that the traveler associated with one group of stations will actuate one register, while its companion actuates the other, or controls the actuation of the other.

The stations are arranged in groups, so that the groups may be identified respectively with affirmative and negative votes and the stations are controlled by remotely positioned means, such as push buttons located at the desks or near the chairs of convention delegates or members in connection with the voting of whom the apparatus is designed to be used.

The invention is also designed to total the number of persons voting and accordingly the two travelers 24 and 25, while they are designed to be actuated synchronously, are out of step, or out of phase, so that station engagement of the two will not occur at the same time.

Since, except for the angular lead or out of phase relation of the two travelers, they are identical, a description of the one will suffice for the other, as is also the case with the stations.

Arranged in the axis of the spiral track of either group of stations is a vertically disposed shaft 26 (Figs. 1, 3 and 13) journalled in the top wall of the housing 27 and having a lower bearing in the bottom wall 28. The traveler is keyed to the shaft 26 for rotation when the shaft rotates, so that if the shaft be driven, angular or turning movement will be imparted to the traveler and by reason of the keyed connection, it may move axially of the shaft and thus follow the spiral track on which the stations are carried.

The spiral track on the upper and lower faces and at the inner edge is equipped with wear strips 29 and 30, preferably steel, and on these bear respectively the rollers 31 and 32, which are carried by the traveler at the outer end of the latter. This arrangement provides an operative connection between the track and the traveler, so that there may be no undue vibratory motion of the outer end of the traveler.

The traveler may traverse the track from the stop 33 at the upper end to the stop 34 at the lower end but, having reached the lower stop, it is necessary for it to be returned to the upper stop and the driving mechanism provides for the automatic accomplishment of this. That is, the shaft 26 is rotated in one direction until the traveler reaches the lower end of the track, when reversal takes place and it is returned to the upper end. Several of these movements are necessary in accomplishing the cycle of operations of the invention, as is hereinafter set out.

The mechanism for imparting angular or turning movement to the shafts 26 comprises a horizontal shaft 35 journalled in bearings on top of the housing of the device and being terminally provided with bevel gears 36 meshing with bevel gears 37 secured to the upper ends of the shafts. The bevel gears 36 engage the gears 37 on corresponding sides of the latter, so that both shafts 26 are rotated in the same direction. At an intermediate point, the shaft 35 carries a worm gear 38 which, however, is only frictionally secured to the shaft by reason of friction disks 39 which, while keyed or otherwise secured to the shaft, bear against the sides of the worm gear.

In mesh with the worm gear 38 is a worm 39' carried by a transverse shaft 40, the latter being journalled in bearings on top of the housing and being provided at one end with a bevel gear 41 in mesh on diametrically opposite sides with bevel pinions 42 and 43. The pinions 42 and 43 are constantly in mesh with the bevel gear 41 but normally float on the shaft 44 by which they are carried, this shaft being arranged in parallelism with the shaft 35 and being journalled in appropriate bearings on top of the housing. The hubs of the pinions 42 and 43 are formed with clutch elements so that they may be alternately clutched to the shaft 44 by the axial movement of a double clutch element 45 which is keyed to the shaft 44 and which is moved axially along the latter by a shifter fork 46. In one position of the double clutch element, it is engaged with the pinion 42, so that movement is imparted to the gear 41 in one direction. If the double clutch element is engaged with the hub of the pinion 43, that pinion will be clutched to the shaft 44, while the pinion 42 will be floating and the gear 41 will be driven in the opposite direction. This, of course, assuming a given direction of rotation for the shaft 44.

The shaft 44 is driven constantly in one direction from a motor 47 positioned on top of the housing and belted, as indicated at 48, and a countershaft 49, journalled in bearings on the housing and provided with a pinion 50 in mesh with a spur gear 51 carried by the shaft 44.

The periodic reversal of the direction of rotation of the shaft 40 and the consequent reversal of the direction of rotation of the shafts 26, with which the shaft 40 is operatively connected as above described, is accomplished by the automatic actuation of the shifter fork 46. To this end the shifter fork has a sliding mounting in the shifter bar 52, the latter having slide bearings in the pillar blocks 53 by which the bearings for the shaft 44 are carried and also having a slide bearing in a housing 54 positioned on top of the main housing adjacent one end and near the front face of the latter. The sliding mounting of the fork in the shifter bar consists of a frame 55 with which the shifter bar is formed and which embraces the shank of the shifter fork, said shank being provided with a pin 56 traversing slots in opposite sides of the frame 55. The shank of the shifter fork extends below the plane of the frame 55 and is formed with a tapered nose 57 arranged in abutting relation with a corresponding nose of a kick-over dog 58, the latter being mounted in a guide on the top of the main housing and being impelled upwardly by means of a spring 59. Axial movement is imparted to the shifter rod 52 and when this movement is in one direction, the pin 56 abuts the extremities of the slots in the frame 55 at one end and thus the shifter fork is moved laterally with the result that the double clutch element 45 is moved axially. But this operation is attended with the depression of the kick-over dog 58 until the tapered lower extremity of the shank of the shifter rod passes the peak of the nose of the dog, after which the action of the spring 59 serves to elevate the dog and thus complete the shift-over motion of the shifter fork. This construction provides for the initial movement of the shifter fork being accomplished by the shifter rod 52 and the clutching operation being completed by a quick shift-over movement due to the kick-over dog 59. The operation is the same, irrespective of the direction of movement of the shifter rod to engage the double clutch element with either of the bevel pinions 42 or 43.

Axial movement of the shift-over rod 52 is derived from the shaft 35 and to this end this shaft is terminally provided with a pinion 60 in mesh with a gear 61 journalled in a bearing on the top of the main housing. The gear 61 is provided with a lateral lug 62 in the opposite faces of which are threaded the abutment screws 64 and 65 which are designed to engage a lug 66 which is disposed in their path of movement and which is carried by a supplemental shifter rod 67, the latter being slidably mounted in bearings on the top of the main frame of the machine, one of the bearings being in the housing 54 below the plane of the shifter rod 52.

An operative connection between the two shifter rods is provided in the form of pinions 68 and 69 mounted on a shaft 70, one of these pinions being in mesh with rack teeth formed on the shifter rod 67 and the other in mesh with rack teeth formed on the shifter rod 52.

By reason of the fact that the shaft 35 is rotated alternately in opposite directions and because of the fact that this change of direction is accomplished by alternately clutching the pinions 42 and 43 to the shaft 44, the shift-over movement can be accomplished by the structure outlined, since the gear 61 during a certain period of the rotation of the shaft will turn in one direction and abutting the lug 66 will shift the shifter rod 67 in that direction and correspondingly move the shifter rod 52 to effect clutch changing position. The abutment screws 64 and 65 are adjustable for nicety of adjustment in determining the shift-over movement.

Each of the stations 20 and 21 comprises a solenoid 71 and associated plunger 72 which, when raised, is in obstructing position with reference to the circuit actuating member carried by the traveler (Figs. 11 and 13). With the solenoid unenergized, the plunger will be depressed or lowered, not only by the gravity of the same but by reason of the action of the spring 73 which is of bowed form, anchored one end to the solenoid with the other end engaged in the extremity of a lever 74, pivotally mounted at 75 and having a universal connection 76 with the plunger, such universal connection consisting of an enlarged rounded portion formed on the lever and engaging an opening in the plunger. Since the plunger is designed to be held in elevated position until it shall have actuated the circuit closer of the passing traveler and since it is not intended that energization of the solenoid be necessary to maintain this elevated position, since that would depend on the human element—the voters who indicate their votes by closing the circuit on the solenoid, a pivoted latch 77 is provided which, when the plunger is elevated, will engage the tail of the lever 74 and thus retain the elevated position of the plunger even after the circuit on the solenoid is opened by the release of the circuit closing means therefor. The latch member 77 is yieldingly impelled in a position to engage the tail of the lever 74 by a leaf spring 78 bearing on the under face of a horizontal arm 79 with which the latch is formed, this arm being in a position to be engaged by the trip roll 80 mounted on the carrier arm.

The invention contemplates the energization of the solenoids 71 of the various stations by the voters and having once operated the circuit closers to indicate their votes, the plungers of the solenoids remain elevated, so as to actuate the circuit closer on the passing traveler and each time the circuit closer is operated the register associated with that traveler is actuated.

The circuit closer on the traveler comprises the parallel spring leaves 81 and 82 mounted on the traveler but insulated from each other and from the traveler by reason of the insulating support 83 by which they are carried. The spring leaves 81 and 82 are normally separated but may be brought into engagement with each other and therefore into circuit closing position by means of a presser foot 84 carried at one extremity of a rock shaft 85 at the other extremity of which is mounted a dog 86 which, when the plunger 72 is elevated, engages the upper end of the latter and thus imparts rocking movement to the shaft 85 with the resultant depression of the presser foot and the engagement of the springs 81 and 82.

The spring engaging element of the presser foot consists of an adjustable screw 87 for adjustment so as to insure spring engagement in the normal arc of movement of the presser foot.

The dog 86 has limited angular movement by reason of the flat spring members 88 secured on diametrically opposite sides of the bearing for the rock shaft 85 and engaging in recesses 89 on diametrically opposite sides of the hub of the dog. The gravital tendency of the dog maintains it in the lowered position for engagement with the upper end of the plunger 72 and this gravital tendency also serves to maintain the presser foot 84 in elevated position.

In the cycle of operations designed to be carried out by the invention, there is included the release of the plungers 72 and this is designed to be accomplished by the traveler through one of its periods of movement past the station. It is during this time that the trip roll 80 is caused to function, as at other times the trip roll will be withdrawn where it will not engage the horizontal arms of the latches 77.

The traveler is provided with a guide sleeve 90, bushed at the outer end as indicated at 91, the inner end of this bushing acting as an abutment for one end of a compression spring 92 which is disposed in surrounding relation to a stem 93 on which the trip roll 80 is rotatably mounted. Secured to the stem 93, as by a pin 94, is a cap member 95 and the inner end of this cap member acts as an abutment for the opposite end of the spring 92. Thus if there is no pressure axially on the stem, the spring will tend to move the stem axially and thus shift the trip roll 80 back towards the plane of the axis of rotation of the traveler and the trip roll will be then in a position where it cannot engage the horizontal arms of the latches. To effect movement of the trip roll outwardly where it can engage these arms, however, there is provided a bell crank lever 96, mounted on the carrier and having its resistance arm provided with a disk-like head 97 seated in a loop in the cap member 95. The force arm of this lever is secured to the lower end of a plunger 98 of a solenoid 99 which is carried by the traveler. When the solenoid is energized, therefore, the bell crank lever is rocked and the trip roll 80 thus shifted out into a position where it will engage the horizontal arms of the latches 77 as the traveler passes succeeding stations.

Since the solenoid 99 and the circuit closer comprising the springs 81 and 82 are on a moving element—the traveler—provision must be made for supplying current to them by sliding connections of some kind. To this end the shaft 26 (Figs. 3 and 14) just below the top of the main housing is provided with a cylindrical head 100 which is of insulating material but which is peripherally bound with the collector rings 101, 102 and 103. At the lower end, the shaft 26 carries an insulating head 104. The heads 100 and 104 are fixed with respect to the shaft and act as supports for the bus bars 105 which are arranged in parallel relation to the shaft, these bus bars at the lower end being seated in the head 104 and at the upper ends entering the head 100 from the under face and one of them being electrically connected with the collector ring 101, the next with the collector ring 102 and the last with the collector ring 103. Brushes 106 bearing on the collector rings and carried in an insulating block 107 constitute the means for conducting current to the collector rings and thus to the bus bars. From the bus bars current is transferred to the required devices on the traveler by reason of the head 108 which is mounted on the hub portion of the traveler and which is of insulating material but which is provided with guide openings through which the bus bars 105 pass. Brushes 109 carried by the head 108 have sliding contact with the bus bars. The construction thus provides for the rotation bodily of the bus bars and the heads 100 and 104 with the shaft 26 and the traveler moving axially of the shaft during the rotation of the latter, the brushes 109 which carry current to the traveler carried parts may slide axially of the bus bars.

To carry out the indicated functions of the apparatus, an automatic circuit closer is provided operating in a four to one ratio with the travelers—that is, the circuit closer moves through an angular distance of 90° for each movement of the traveler between its stops 33 and 34. This circuit closer (Figs. 8, 9 and 10) consists of a rotary contact arm 110 carried on the upper end of the shaft 111 and traversing, as the shaft rotates, the sectors 112, 113, 114, 115, and 116, the sectors being set in an insulating block 117. The contact arm 110 is preferably insulated from the shaft 111 but current is delivered to it through a spring-pressed brush 118 bearing upon the arm at the center of the shaft and carried in a brush holder 119 mounted in the center of the case 120 in which the circuit closer is enclosed. The case 120 is positioned above the case 121 by means of an intervening hub portion 122 through which the shaft 111 extends. In the casing 121 is enclosed a ratchet wheel 123 which is mounted on the shaft 111 at the lower end. A spring impelled latch lever 124 engages the ratchet wheel on one side and on the diametrically opposite side it is engaged by the pawl 125 of a ratchet bar 126, the pawl being swingingly mounted on the ratchet bar and the latter slidably mounted in opposite walls of the case 121. As the ratchet bar is moved axially against the pressure of the spring 127, a specified angular movement is imparted to the ratchet wheel, the latch lever being forced out of engagement with one pair of teeth and dropping into engagement with the next pair, after the ratchet bar has reached the limit of its axial movement. On this forward stroke of the ratchet bar, the pawl 125 abuts the stop 128, so that it is fixed with reference to the ratchet bar during this interval but may swing with reference to the ratchet bar during the return of the latter by reason of the spring 129 tensioned between the pawl and a point on the ratchet bar.

The forward stroke of the ratchet bar is derived from the shaft 26 of the traveler 25 by means of a pin 130 fixed on the under face of the gear 37 (Fig. 1) of that shaft where, when the gear rotates, it may engage the periphery of the disk-like head 131 of a lever 132 pivotally mounted on top of the main housing of the apparatus. The lever is provided with an adjusting screw 133 abutting a fixed stop 134 to determine the inward swinging movement of the head of the lever from the pressure of the spiral spring 135 with which the lever is equipped. The free end of the lever 132 engages the adjustable abutment 136 of the ratchet bar 126.

A manual control switch is provided for use in carrying out the indicated functions of the apparatus and this consists of a contact arm 137 mounted on an angularly movable shaft 138 in common with the disks 139 and 140 (Figs. 15, 16 and 17). The contact arm is adapted to engage the angularly spaced segments 141ª, 141, 142 and 143, these segments being arranged in spaced relation. A supplemental contact arm 144 is mounted on the upper face of the contact arm 137 and is slidable on headed pins 145 surrounding which are springs 146 which bear upon the upper face of the contact arm 144 so as to keep it normally down on top of the contact arm 137. Terminally the contact arm 144 extends beyond the extremity of the contact arm 137, so that it may engage the contact segment 147 which is positioned angularly ahead of the segment 141ª but which is overhung with the flange 148ª of an insulating shield 148, which flange is inclined downwardly toward the segment 141ª. In moving from initial position, the contact arm will move under the flange and engage the segment 147 prior to the arm 137 engaging the segment 141ª. In the return movement, however, the protruding end of the arm 144 will engage the lower end of the flange 148ª and traverse over the top of the latter, so that it is kept out of contact with the segment 147. Thus in moving the switch from the inactive to the active position, the arm 144 will engage the segment 147 but will be prevented from engaging this segment on the return of the switch to inactive position.

A spring 149 is employed to return the arm to inactive position.

Peripherally the disk 140 is provided with spaced seats 150 to be engaged by the spring-pressed pawl 151, this pawl holding the arm in any of its several positions of engagement with the segments 141ª—142, or the engagement of the arm 144 with the segment 147. This pawl is only sufficient to accomplish this function, however, if the arm be moved gradually to the selected position. If the arm be released from the extreme right hand position which is the full operating position, the spring 149 will carry the seats past the pawl 151, because of the circular contour of the seats which will prevent arresting action by the pawl if the arm be moving at any speed as it will in returning to inoperative position.

The full operating position, which is where the arm 137 engages only the segment 143, is maintained by a spring retracted dog 152 which engages a seat or notch 153 in the disk 139. The dog is moved into notch engaging position by reason of the pull applied to it from a magnet 154.

Registers 155, 156 and 157 are provided, the first, say, to indicate "ayes", the second to indicate totals and the third to indicate "noes" (Figs. 2 and 18). Operation of each is effected through the instrumentality of an individual electromagnet 158 exercising a pull on an oscillating lever 159. Each time a magnet is energized, a register will be moved one digit. These registers are of conventional form but are of the character that cannot be turned reversely past the zero setting. Since it is necessary that they be set to zero position prior to each vote, each register is provided with a return wheel having a drive belt 160 traversing a pulley mounted on the shaft 161 between friction disks 162. Thus when the shaft 161 is rotated, all of the registers will be returned to zero position, the pulleys on the shaft 161 connected with those to first reach zero position sliding between the friction disks until all have reached the zero setting. Motion is communicated to the shaft 161 by means of a motor 163 having a reduction gear drive 164 with the shaft.

Relays 165, 166 and 167 are provided for use in connection with the manual and automatic control switches hereinbefore described, the relay 167 controlling the circuit on the motor 47 and the relay 166 effecting a change-over of circuits, so that the totalling register 156 may function during one period and the affirmative and negative function independently during another period. The relay 165 is a supplemental device designed as a test or precautionary feature. The magnets constituting the stations are preferably low voltage magnets and if the source of current employed to operate the invention be direct, provision for battery operation will preferably be made for the actuation of the register magnets and the station magnets. With alternating current, the high and low voltages may be obtained from the single source by the use of a transformer such as indicated at 168 whose primary is connected across the supply line and whose secondary is connected by means of a conductor 169 with one side of the push buttons or other circuit closers 170 and 171. The opposite terminals of the switches 170 are connected to one terminal of the magnets of the stations 21, while the opposite terminals of the switches 171 are connected to one terminal of the magnets of the stations 20. The remaining terminals of all of the station magnets are connected in common on the conductor 172 which leads to the opposite terminal of the secondary of the transformer 168 but through an indicating meter 173. This meter is shunted with the armature 174 of the relay 165. If the latter is unenergized, the meter is in circuit; if it is energized, the armature is attracted and the meter is shunted. The supply line is carried past the primary of the transformer 168, as indicated at 175, through the key switch 176 and thence to one terminal of each of the magnets 158, as indicated at 177. A conductor 178 connects one terminal of the motor 47 with the arm 137, the other terminal of the motor being connected by a conductor 179 with a contact engaged by the armature 180 of the relay 167. When the key operated switch is open, the register magnets are deprived of current, irrespective of what is done with the rest of the apparatus. When the switch 176 is closed with the key, the register magnets can be made to function by the proper manipulation of the other parts of the apparatus. One terminal of each of the relays 165, 166 and 167 is connected in on a common conductor 181 which is tapped in on the conductor 175. The remaining terminal of the relay 165 is connected by a conductor 182 with the segment 141 of the hand switch. The remaining terminal of the relay 166 is connected by a conductor 183 with the segment 113 of the automatic switch. The remaining terminal of the relay 167 is connected by a conductor 184 with the segment 112 of the automatic switch but in series with the magnet 154. A tap is taken in the conductor 184 between the relay 167 and the magnet 154, as indicated at 185, and is run to the segment 142, this tap including a resistance 186 equal to the resistance of the magnet 154.

The armature 187 of the relay 166 is arranged to engage the free terminals of rocker levers 188 and 189, pivotally mounted as indicated at 190, these levers being yieldingly held against contacts 191 and 192 respectively. One terminal of the trip magnet of the register 157 is connected by a conductor 193 with the contact 192, while the corresponding terminal of the trip magnet of the register 155 is connected by a conductor 194 with the contact 191. One terminal of the trip magnet of the register 156 is connected by a conductor 195 with the armature 187.

Conductors 196 and 197 connected with the brushes bear on the collector rings 103 of the shafts of the travelers 24 and 25 respectively and the springs 82 of the circuit closers of these travelers are electrically connected with the rings 103. The springs 81 of the circuit closers which connect electrically with the collector rings 102 are electrically connected in common on a conductor 198 which connects with the segments 115 and 114 of the automatic circuit closer, these segments being cross-connected as indicated.

The collector ring 101 associated with each traveler is connected with one terminal of the magnet 99 of that traveler, the other terminal of the magnet being grounded, as indicated at 199, the energizing source for these trip magnets which consists of the secondary of a transformer 200, being grounded, as indicated at 201. The ungrounded terminal of the transformer secondary is connected by means of a conductor 202 with the brushes bearing upon the collector rings 101 of the two traveler shafts.

The primary of the transformer is connected across the supply line by a lead 203 running to one side of the line and a lead 204 running to the segment 116, so that this primary is connected across the line when the contact arm 110 bridges the segments 116 and 112. A conductor 205 runs from the segment 143 to the arm 110. One side of the supply line is connected to the arm 137 by a conductor 206, while a conductor 207 connects the segment 147 with one terminal of the motor 163, whose other terminal is connected in by a conductor 208 tapped in on the conductor 175.

In the operation of the invention, there will be a circuit closer 170 and a circuit closer 171 available to each voter entitled to vote and as he votes affirmatively or negatively, he will press either the button 171 or 170. The first operation in recording the vote is to close the switch 176 by means of the appropriate key, this putting the register magnet in circuit. Then the switch arm 137 is shifted the proper angular distance to bring the arm 144 into engagement with the contact 147. Current will then flow from the supply line to the arm, to the segment 147, over the conductor 207, through the motor 163, the conductor 208 and the conductor 175 back to the supply line. The motor 163 will thus be set in operation and the registers will be rotated backwardly until they are brought to the zero point and when this is indicated on the front of the machine the arm 137 may be shifted angularly to the next position when it will engage the segment 141a but only that segment which, being dead, will result in a circuit opening operation, insofar as any circuit controlled by the arm 137 is concerned. But in this position, the apparatus will be in condition for indicating, prior to the registration of any votes, whether the voting stations are all on open circuits, for the voltmeter 173 will be in series with the stations across the secondary of the transformer 168. Should any of the station actuating buttons be closed, current will flow over the conductor 169, through the closed switch and affected station, over the conductor 172 back to the secondary of the transformer, passing through the meter 173, since this is included serially in the conductor 172. Any meter reading will indicate a condition that should not exist and investigation is then made for the trouble, or if any one of the switches 170 or 171 is closed, it is opened and the fact will be indicated on the meter 173 by its indicator moving to zero. The test position of the arm 137 indicating that the station switches 170 and 171 are in inoperative position, the arm 137 is moved to the next position to engage the segment 141, when current, having reached the arm 137, will flow over the conductor 182, through the relay 165 and back to the line over the conductors 181 and 175. Energizing the relay, results in raising its armature 174, which shunts the meter 173 and thus leaves the volting stations across the secondary of the transformer 168. Then the voting operation is carried out by each voter operating either of his circuit closers 170 or 171, thus rendering active the "aye" or "no" station.

The voting operation having been effected by the closure of the desired circuit closers 170 and 171, the next operation is that of counting the votes and the arm 137 is therefore moved to the next position to bridge the segments 142 and 143, the contact with the former of which effects closure of the motor circuit, current flowing from the arm to the segment 142, thence over the conductor 185 and through the resistance 186 to the winding of the relay 167 over the conductor 184 and thence back to the opposite side of the line. But energizing the relay 167 results in attraction of its armature 180 which, bridging its associated contacts, effects electrical connection between the conductors 179 and 181, so that current may then flow over the conductor 178, through the motor 47, over the conductor 179, armature 180 and conductor 181 back to the opposite side of the line. The motor thus begins to turn and with it the arm 110 to which a potential has been applied by the contact of the arm 137 with the segment 143 from which current flows over the conductor 205 to the arm. The initial movement of the arm brings it into engagement with the segments 112, 113 and 114. Parallel paths are thus provided for the current, one over the conductor 183 and through the winding of the relay 166 back to the other side of the line, the other over the cross-connection to the segment 115 and over the conductor 198 to the collector rings 102 Energizing the relay 166 elevates the armature 187 into engagement with the levers 188 and 189, thus rocking them and disengaging them from the contacts 191 and 192, so that the magnets of the registers 155 and 157 are cut out of circuit, but the magnet of the register 156 cut into circuit by the armature bridging the two levers. That increment of the current which flows over the conductor 198 to the collector rings reaches the contact springs 81 of the circuit closers on the two travelers by reason of the heretofore described electrical connections between the springs and the collector rings. Thus the circuit is closed by each actuated station whether of the group indicated at 20 or that indicated at 21. Since the travels are out of phase, the one will engage a station in its group prior to the other engaging the corresponding station in its group. In Fig. 4 the travelers are shown with the traveler 24 in advance of the traveler 25 and since the operative connection between them is a geared connection, there can never be any change in their relative positions. With respect to the stops 33 and 34, the stop 34 on track 22 will act as a limiting stop in downward movement and the stop 33 on the track 23 will act as a limiting stop in the upward movement. If the travelers be set so that the traveler 25 will lead, then the other two stops will function as limiting stops. Each station effecting the operation of the circuit closer on its attendant traveler results in the flow of current over the conductors 196 and 197, to the armature 187 and thence over the conductor 195, through the magnet of the register 156, thence to the switch 176 over the conductor 177 and thence back to the opposite side of the line over the conductor 175. Thus each time a circuit closer is operated, the magnet of the register 156 will be energized and the register will be moved to expose a new digit. This operation takes place, say, as the travelers move down the tracks from the upper stops 33 to the lower stops 34 and when the lower stops are reached, the contact arm 110 will have moved through the first quadrant or 90°. Prior to this operation, however, the selected switches 170 or 171 have been closed, thus rendering the stations in the one or the other groups operative and this results from current flowing from the secondary of the transformer 168 to the switches 170 and 171, thence through the magnets of the connected stations and thence over the conductor 172 back to the source in the secondary of the transformer.

After the movement of the switch arm through the first quadrant of the automatic circuit closer, it leaves the segments 113 and 114 and through the next quadrant engages only the segment 112. But on the leading traveler reaching the lower stop 34, the direction of rotation of the actuating shafts is changed and the travelers are carried back up the spiral tracks and during this return movement the arm 110 moves through the second quadrant when it is only in engagement with the segment 112. The trailing traveler having reached its upper stop 33, the rotation of the actuating shafts is again changed and the travelers are started on the downward path, this time with the arm 110 entering the third quadrant and in engagement with the sectors 112 and 115, when there is one increment of the current passing over the conductor 198 and through the circuit closers of the two travelers to the levers 188 and 189. When the switch arm 110 left the segment 113, the relay 166 was deprived of current and the armature accordingly dropped, so that the levers or rockers 188 and 189 returned to engagement with the contacts 191 and 192. Thus that portion of the current flowing over the conductor 197 results from the actuation of the circuit closer on the traveler 24, while that portion passing over the conductor 196 results from the actuation of the circuit closer on the traveler 25. Since the one traveler is responsive to the "ayes" and the other to the "noes", the current flowing over the conductor 199 at this period in the operation passes over the conductor 193 and through the magnet of the register 157. The current flowing over the conductor 197 passes over the conductor 194 and through the magnet of the register 155. Thus the operation which had previously resulted in totalling the vote on the register 156 is at this instant divided to separate the "ayes" and "noes" by recording the former on the register 155 and the latter on the register 157. But this operation is being carried out as the travelers move down the tracks and is completed when the leading traveler reaches its stop 34 when the reversal of rotation takes place and the travelers are returned up the tracks at the time the arm 110 is entering the fourth quadrant of the automatic circuit closer, where it engages the segments 112 and 116. When the segment 116 is put in circuit, it closes the primary of the transformer 200, current flowing from the segment 143 of the manual switch to the contact arm 110, thence to the segment 116, thence over the conductor 204 and through the primary of the transformer to the opposite side of the line. The primary having been energized, the secondary will also be energized and current will flow from this over the conductor 202 to the collector rings 101 associated with the two travelers and thus reaches the windings of the magnets 99 from which it flows back to the secondary of the transformer through the ground connections. But energizing the magnets 99, results in projecting the trip rolls 80 into a position where they will engage the horizontal arms of the latches 77 as the travelers rotate. Thus the plungers of the stations in the groups 20 and 21 will be returned to normal or inactive position and this on the return movement of the travelers up the tracks. When the contact arm 110 reaches the dead zone defined by the separated ends of the sector 112 and the spacing between the adjacent ends of the sectors 116 and 113, all of the parts will be deprived of current, including the magnet 154 which, by reason of it having been energized, has moved the dog 152 into engagement with the notch 153 to retain the switch arm 137 in its remote operative position. De-energizing the magnet 154, however, leaves the actuating spring of the dog 152 operative to retract the dog, so that the latter is disengaged from the notch 153 and the arm is returned to the inactive position through the action of the spring 149, the contact arm 144 being kept out of engagement with the segment 147 during this movement by reason of its riding over the inclined flange of the shield 148. Thus the registers are left in position for the total vote to be observed and the number of "ayes" and number of "noes" comprised in that total. But in starting the operation, the registers are automatically returned to zero position by the first step in the movement of the hand switch, as previously described.

The invention having been described, what is claimed as new and useful is:

1. A vote registering apparatus comprising a plurality of groups of stations, means for individually rendering each station operative, a traveler for each group of stations and traversing the stations of that group, a register operatively connected with each traveler and rendered operative by the latter on the traveler passing an operative station, and an additional register operatively connected with all the travelers and rendered operative on any traveler passing an operative station, the travelers moving synchronously but out of phase.

2. A vote registering apparatus comprising a plurality of groups of stations, means for individually rendering each station operative, a traveler for each group of stations, a register operatively connected with each traveler and rendered operative by the same when the traveler passes an operative station, an additional register operatively connected with all of the travelers and rendered responsive by any upon the same passing an operative station to total the amounts indicated by the registers of the individual travelers, and automatic means to effect functioning of the totalling register during one period of time and the individual registers during another period of time.

3. A vote registering apparatus comprising a duality of spiral tracks, a plurality of stations disposed along each of said tracks, a rotary traveler traversing each of said tracks, means for rendering each station individually operative, a circuit closer carried by each traveler and actuated when the traveler passes an operative station, an electrically operated register controlled by each circuit closer, a common driving means for both travelers, means for reversing the driving means periodically to return the travelers, an additional electrically operated register controlled by the circuit closers of both travelers, and automatic means to successively render the last said register responsive to the circuit closers and the individual registers responsive thereto.

4. A vote registering apparatus comprising a duality of spiral tracks, a plurality of stations disposed along each of said tracks, a rotary traveler traversing each of said tracks, means for rendering each station individually operative, a circuit closer carried by each traveler and actuated when the traveler passes an operative station, an electrically operated register controlled by each circuit closer, a common driving means for both travelers, means for reversing the driving means periodically to return the travelers, an additional electrically operated registered controlled by the circuit closers of both travelers, and automatic means to successively render the last said register responsive to the circuit closers and the individual registers responsive thereto, the travelers moving in synchronism but out of phase.

5. A vote registering apparatus comprising a spiral track, a plurality of stations disposed along said track, and comprising solenoids and associated plungers, remotely positioned control means for each solenoid to render the same operative, a rotatable shaft disposed in axial coincidence with said track, a traveler axially but not angularly movable on said shaft and traversing said track, a circuit closer mounted on said traveler and tripped to circuit closing position by the plunger of any solenoid station that is elevated, and an electrically operated register controlled by said circuit closer.

6. A vote registering apparatus comprising a spiral track, a plurality of stations disposed along said track, and comprising solenoids and associated plungers, remotely positioned control means for each solenoid to render the same operative, a rotatable shaft disposed in axial coincidence with said track, a traveler axially but not angularly movable on said shaft and traversing said track, a circuit closer mounted on said traveler and tripped to circuit closing position by the plunger of any solenoid station that is elevated, an electrically operated register controlled by said circuit closer, driving means for said shaft, and automatic reversing means for the same.

7. A vote registering apparatus comprising a spiral track, a plurality of stations disposed along said track, and comprising solenoids and associated plungers, remotely positioned control means for each solenoid to render the same operative, a rotatable shaft disposed in axial coincidence with said track, a traveler axially but not angularly movable on said shaft and traversing said track, a circuit closer mounted on said traveler and tripped to circuit closing position by the plunger of any solenoid station that is elevated, an electrically operated register controlled by said circuit closer, driving means for said shaft, and automatic reversing means for the same, the traveler having rollers engaging the track on the upper and lower faces thereof.

8. A vote registering apparatus comprising a spiral track, a plurality of stations disposed along said track, and comprising solenoids and associated plungers, remote positioned control means for each solenoid to render the same operative, a rotatable shaft disposed in axial coincidence with said track, a traveler axially but not angularly movable on said shaft and traversing said track, a circuit closer mounted on said traveler and tripped to circuit closing position by the plunger of any solenoid station that is elevated, and electrically operated register controlled by said circuit closer, driving means for said shaft, and automatic reversing means for the same, said stations having latching means to retain the plungers elevated, and automatic release means for said latching means.

9. A vote registering apparatus comprising a spiral track, a plurality of stations disposed along said track, and comprising solenoids and associated plungers, remotely positioned control means for each solenoid to render the same operative, a rotatable shaft disposed in axial coincidence with said track, a traveler axially but not angularly movable on said shaft and traversing said track, a circuit closer mounted on said traveler and tripped to circuit closing position by the plunger of any solenoid station that is elevated, an electrically operated register controlled by said circuit closer, driving means for said shaft, and automatic reversing means for the same, said stations having latching means to retain the plungers elevated, and automatic release means for said latching means, said releasing means comprising a magnet carried by the traveler.

10. A vote registering apparatus comprising a spiral track, a plurality of stations disposed along said track, and comprising solenoids and associated plungers, remotely positioned control means for each solenoid to render the same operative, a rotatable shaft disposed in axial coincidence with said track, a traveler axially but not angularly movable on said shaft and traversing said track, a circuit closer mounted on said traveler and tripped to circuit closing position by the plunger of any solenoid station that is elevated, an electrically operated register controlled by said circuit closer, driving means for said shaft, and automatic reversing means for the same, said stations having latching means to retain the plungers elevated, and automatic release means for said latching means, said releasing means comprising a magnet carried by the traveler, and an automatic circuit closer for the same driven in timed relation with the traveler.

JOSÉ A. PEREYRA.